United States Patent

[11] 3,599,798

[72] Inventor George M. Osborn
 275 Center St., San Rafael, Calif. 94901
[21] Appl. No. 859,981
[22] Filed Sept. 22, 1969
[45] Patented Aug. 17, 1971

[54] BICYCLE RACK
 5 Claims, 5 Drawing Figs.
[52] U.S. Cl. ................................................. 211/20,
 211/24
[51] Int. Cl. ...................................................... A47f 7/00
[50] Field of Search ........................................... 211/17, 20,
 21, 22, 23, 24

[56] References Cited
FOREIGN PATENTS
 20,828 9/1894 Great Britain................ 211/20

221,777 9/1942 Switzerland.................. 211/20

Primary Examiner—Nile C. Byers, Jr.
Attorney—George B. White

ABSTRACT: A pair of parallel base boards, at least two sets of parallel cross boards interlocked with the base boards at about 45° included angle with the base boards; the parallel cross boards in each set being spaced apart to form a space to hold a bicycle wheel; the base boards being spaced apart to form the ends of said space and also obstructions or risers for the bicycle wheel, and to hold several bicycles longitudinally staggered thereby preventing abutting of the handle bars of any bicycle with the handle bars or seats of adjacent bicycles parked in the rack, means being provided to interlock several racks in longitudinal series. Each rack unit is invertible to slant in either direction.

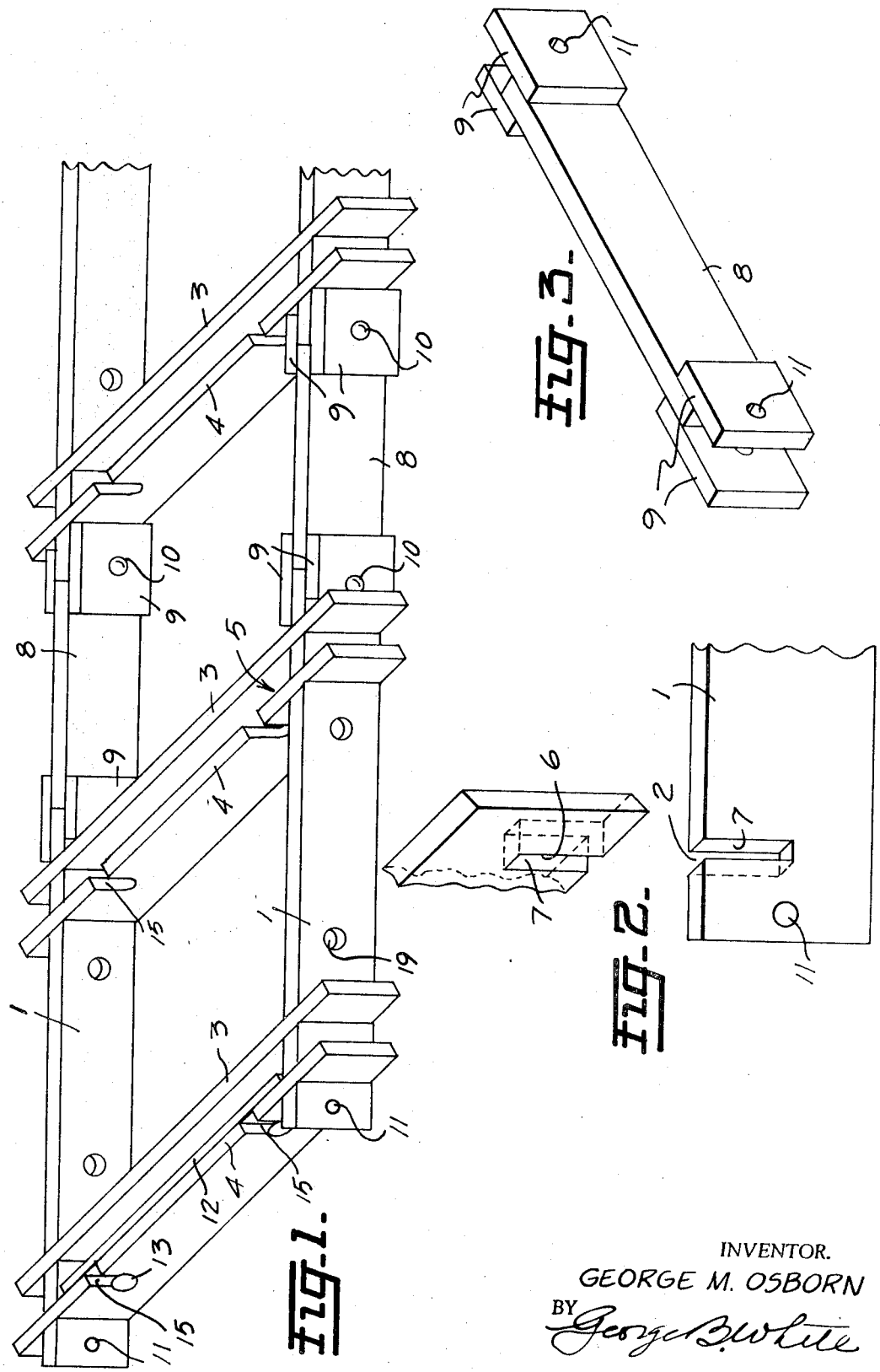

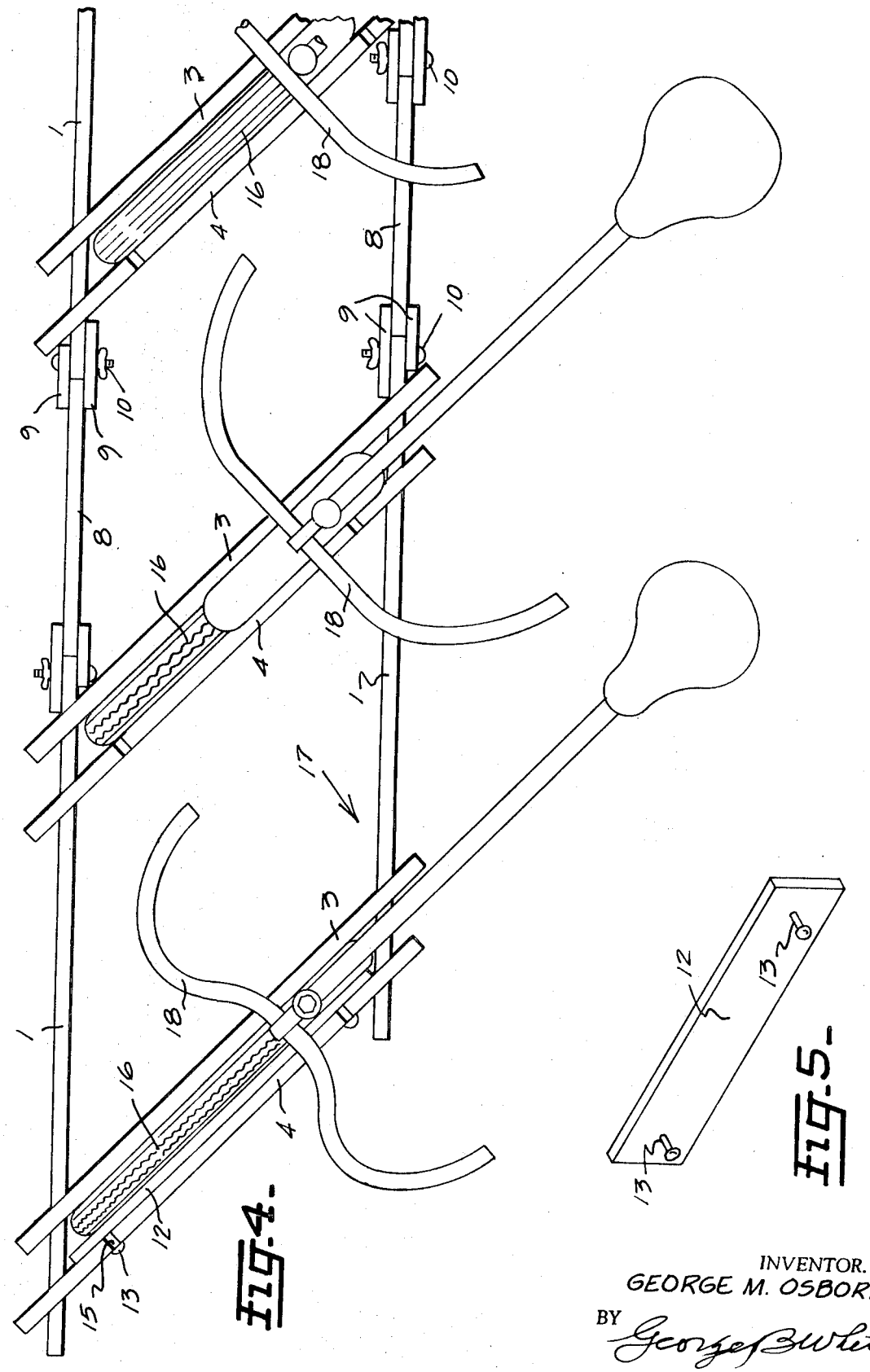

BICYCLE RACK

BACKGROUND OF THE INVENTION

In bicycle racks heretofore used the bicycles were held in the rack at right angles to a base line and required perpendicular cages or rails for support, and needed larger floor space for placing the bicycles in the rack and for removal.

An object of this invention is to provide a bicycle rack unit with two or more parallel supports at such angle to a base limit line as to hold the bicycles in staggered position relatively to one another, thereby to facilitate the depositing and removal of bicycles in a limited space.

Another object of the invention is to provide a bicycle rack unit including parallel baseboard and removably interlocking cross boards forming spaced slots for the bicycle at about 45° angle to prevent the abutting of each handle bar with the handle bars or seats of adjacent bicycles in the rack when a bicycle is deposited in or is removed from between the respective cross boards; the baseboards also serving as risers to lift the bicycle wheel during depositing or removal, thereby to accommodate more bicycles in a limited space.

BRIEF DESCRIPTION OF DRAWING

FIG. 1 is a perspective view of a bicycle rack unit for two bicycles, showing the connecting spaces for another unit.

FIG. 2 is a fragmental developed view showing the interlocking of a cross board to the baseboard.

FIG. 3 is a perspective view of the connecting spacer, for connecting rack units in series.

FIG. 4 is a plan view of the rack with the front wheels of bicycles therein.

FIG. 5 is a perspective view of filler board to adapt the rack to a narrower bicycle wheel.

DETAILED DESCRIPTION

The rack unit is made of suitable boards to be transported knocked down.

Parallel baseboards 1 have a slot 2 spaced from each end thereof, extending from the top edge about half the width of the baseboard.

Parallel pairs of cross boards 3 and 4 are spaced apart to form a space or slot 5 for the wheel of a bicycle. Spaced from each end of each cross board 3 or 4 is a vertical slot 6 extending from the bottom edge of each cross board 3 or 4 about half the width of the cross board.

The slots 2 on the opposite baseboards 1 and the slots 6 in the cross boards 3 or 4 have slanting sides 7 at such angles that when assembled the cross boards 3 and 4 are at 45° included angle relatively to the baseboards 1. Each pair of cross boards 3 and 4 forms a set for a bicycle wheel, and in the herein illustrative embodiment there are two sets of pairs of cross boards in a unit. The rack may be made with any number of such sets of cross boards, but a rack of required length may be formed by coupling several units in series. For such coupling a connecting spacer is provided in the form of a spacer board 8 with a pair of coupling boards 9 at each end thereof fitting over the respective ends of the baseboards 1 of adjacent units, as shown in FIGS. 1 and 4. A suitable pin or bolt 10 extended through registering holes 11 in the coupling boards 9 and through the respective ends of the baseboards 1 hold the adjacent units rigidly in line.

Most of the bicycles at present have tires of 1¾-inch wide and each set of cross boards 3 and 4 are spaced for that width. To accommodate a narrower tire a filler board 12 is inserted along the inside of the cross board 4 as shown in the first set at the left of FIGS. 1 and 4 and in detail in FIG. 5. A pair of headed pins 13 extend from a face of the filler board 12 and are inserted into correspondingly spaced edge slots 15 in the adjacent cross board 4 to hold the filler board 12 in place.

In operation the front wheel 16 of a bicycle 17 is rolled into the space between the cross boards 3 and 4. As the bicycle wheel 16 is rolled into or out of the rack the adjacent portion of the baseboard 1 raises the wheel 16 so that its handle bar 18 is raised above the handle bar of next adjacent bicycle 17. The rack is placed on the ground or on the floor of a garage or the like so that the baseboard 1 are substantially parallel with the adjacent wall or fence, or boundary, and the bicycles can be easily deposited or removed in a limited space. If the space so requires the direction of parking can be reversed by inverting the rack upside down.

In the illustrative embodiment herein the boards are about ¾-inch plywood, the filler board being ⅜-inch plywood. The sets of pairs of cross boards are spaced about 21 inches apart and the spacer board 8 and its coupling boards 9 are of such length as to space adjacent units apart the same distance. The baseboards are spaced about 18 inches apart, and the space 5 for the bicycle wheel is about 20 inches. The height of each board is about 6 inches. Thus the rack, although it is low on the ground and occupies comparatively small space, is sufficient to prevent any substantial tipping of the bicycles therein.

The rack is simple, inexpensive, readily transportable in knockdown condition, easy to assemble, permits the support of one or more bicycles in a neater fashion, in less space with better accessibility to the users, and it is convertible to left-hand side or right-hand side of a floor area, such as a garage. Holes 19 in the baseboards 1, accommodate a fastening chain for locking the bicycle to the rack.

I claim:

1. A bicycle rack for holding bicycles at an angle to a given base line,
    a pair of spaced parallel base members, adapted to be placed parallel with said base line,
    a plurality of sets of crossmembers detachably interlocked with said base members at said angle, each set being formed of a pair of parallel crossmembers,
    said angle and the spacing between said base members determining a space between each pair of crossmembers and a portion of the baseboards between said crossmembers to accommodate a wheel of a bicycle for holding adjacent bicycles substantially vertical in the rack with the handles and seats of each bicycle being staggered longitudinally with respect to the adjacent bicycle for clearing the respective handles and seats during insertion and removal of the respective bicycles.

2. The bicycle rack specified in claim 1, and
    said angle being substantially 45° angle included by the crossmembers and the baseboards.

3. A bicycle rack for holding bicycles at an angle to a given base line,
    a pair of spaced parallel base members,
    a plurality of sets of crossmembers interlocked with said base members at said angle, each set being formed of a pair of parallel crossmembers,
    the space enclosed between each pair of crossmembers and the portions of the baseboards between said crossmembers accommodating a wheel of a bicycle for holding the bicycle substantially vertical in the rack,
    detachable connector means for connecting adjacent rack units in series.

4. A bicycle rack for holding bicycles at an angle to a given base line,
    a pair of spaced parallel base members,
    a plurality of sets of crossmembers interlocked with said base members at said angle, each set being formed of a pair of parallel crossmembers,
    the space enclosed between each pair of crossmembers and the portions of the baseboards between said crossmembers accommodating a wheel of a bicycle for holding the bicycle substantially vertical in the rack,
    said base members and crossmembers being detachably interconnected boards, the interconnection being half lapping slots with sides at 45° angles relatively to the baseboard.

5. The invention specified in claim 3, and
    said detachable connector means comprising a spacer board, and coupling means at the ends of said spacer board connectable to the respective ends of said baseboards of adjacent units.